C. SCHMIDT.
TRANSMISSION GEARING FOR MOTOR VEHICLES.
APPLICATION FILED APR. 28, 1904.

1,013,450.

Patented Jan. 2, 1912.
3 SHEETS—SHEET 2.

Witnesses

Inventor
Charles Schmidt
By Foster Freeman Watson
Attorneys

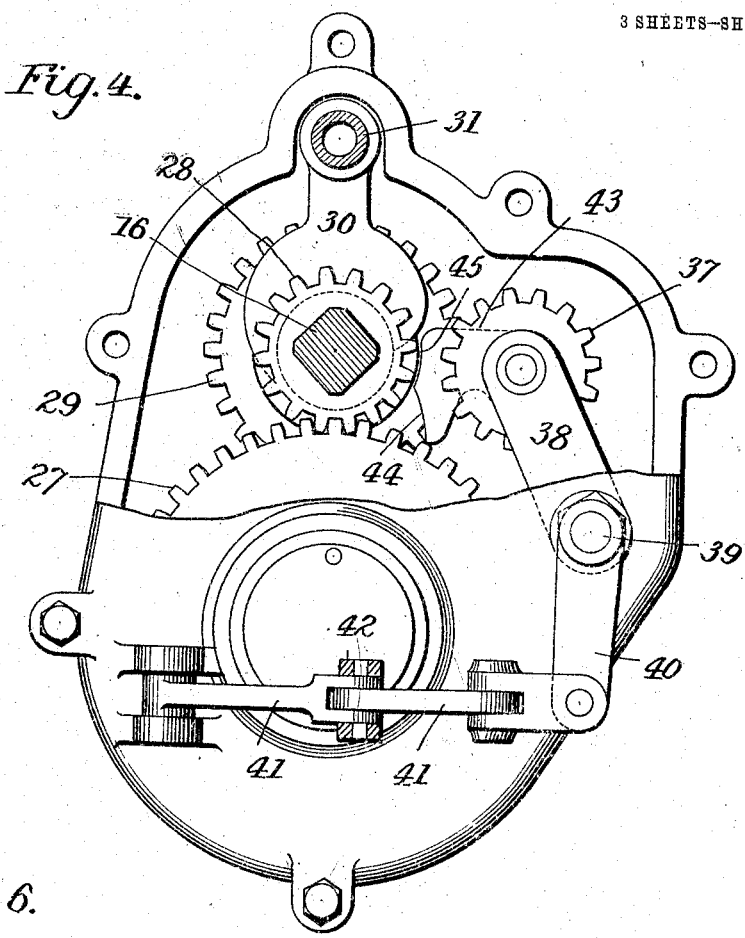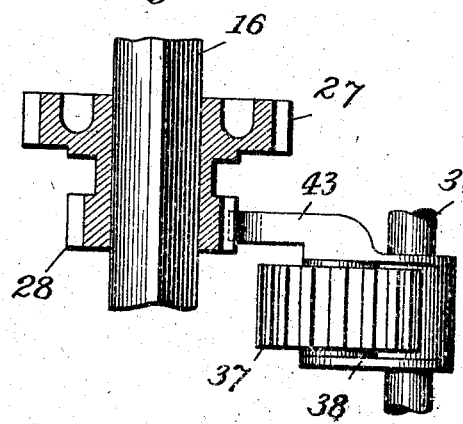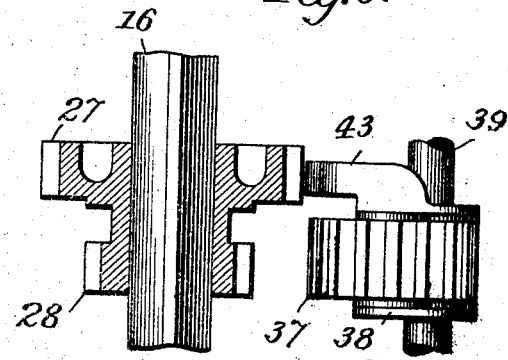

UNITED STATES PATENT OFFICE.

CHARLES SCHMIDT, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TRANSMISSION-GEARING FOR MOTOR-VEHICLES.

1,013,450.   Specification of Letters Patent.   Patented Jan. 2, 1912.

Application filed April 28, 1904. Serial No. 205,325.

*To all whom it may concern:*

Be it known that I, CHARLES SCHMIDT, a citizen of France, residing in the city of Detroit, county of Wayne, and State of Michigan, have invented certain new and useful Improvements in Transmission-Gearing for Motor-Vehicles, of which the following is a specification.

The present invention relates to various improvements in transmission gearing for motor vehicles and more especially to a transmission gearing which is located adjacent to and directly geared with the rear axle.

Figure 1:
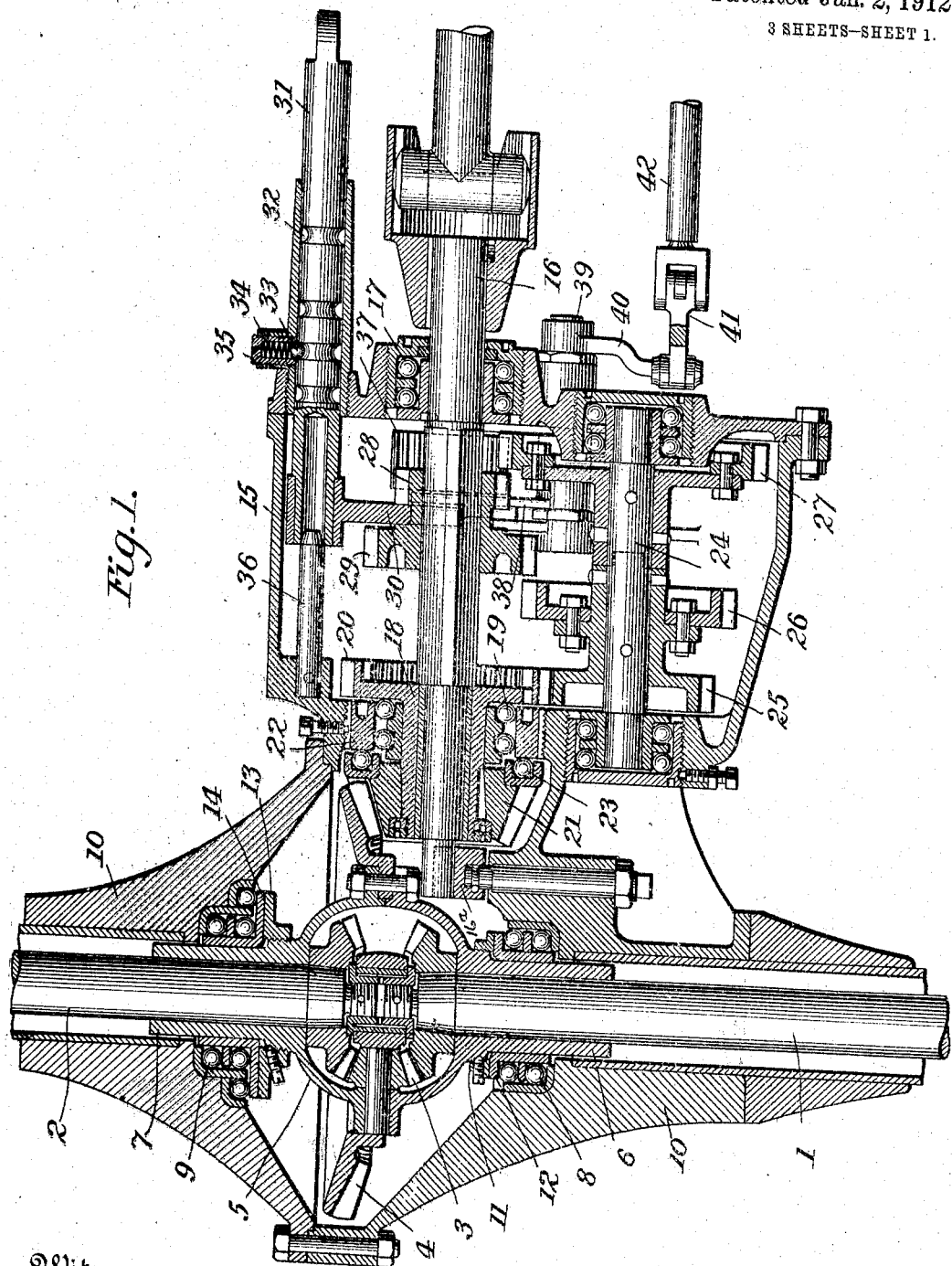
Figure 2:
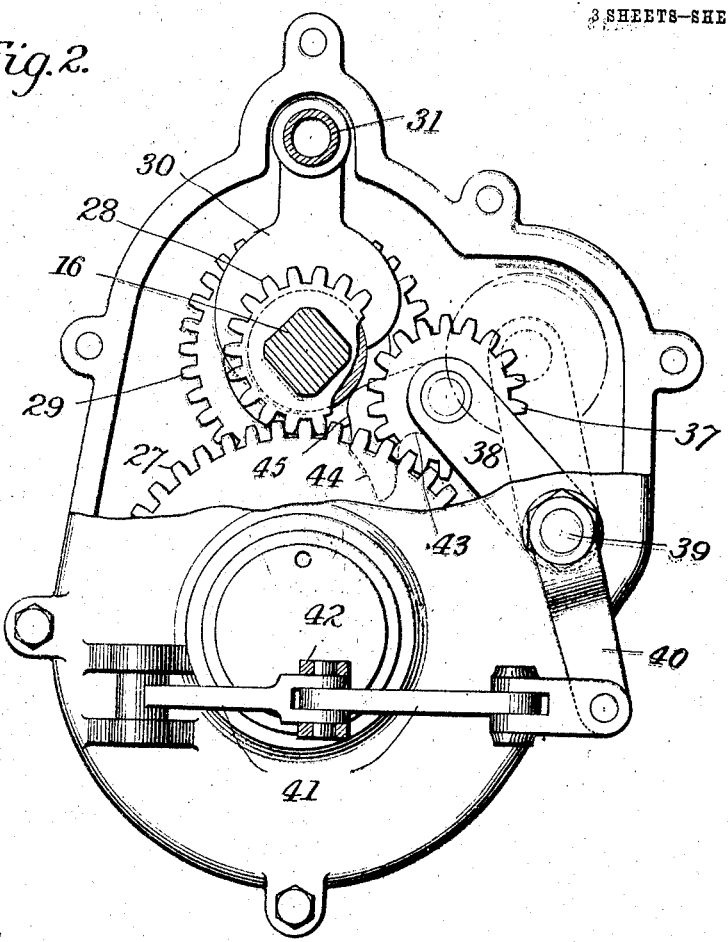
Figure 3:
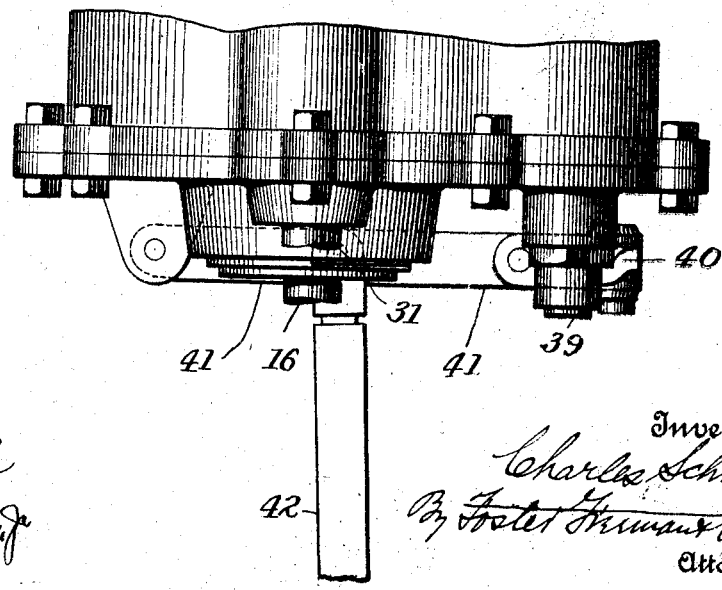

The invention will be described in detail in connection with the accompanying drawings, in which, Figure 1 is a horizontal section through the rear axle and the gearing; Fig. 2 is an end view looking from the front of the machine; Fig. 3 is a side view of part of Fig. 2; Fig. 4 is a view showing the interlocking device for preventing operation of the reverse gear while the forward speed gears are in mesh; Fig. 5 shows the interlocking shoe in engagement with the larger shifting gear; and Fig. 6 shows the interlocking shoe in engagement with the smaller shifting gear.

The present invention comprises various improvements in the gearing which is the subject matter of my pending application, Serial Number 162,631, filed June 22, 1903.

Referring to the drawings, 1, 2 indicate the two sections of the driving axle. These sections are suitably connected by differential gearing 3 which is driven by a beveled gear 4. The gear 4 is supported on a casing 5 which incloses the differential gears and which has two diametrically opposite sleeves, 6, 7 which form bearings for the driving axle sections. The casing 5 and the sleeves 6, 7 generally turn with the driving axle and they are supported in ball bearings 8, 9 within a fixed frame or casing 10. Threaded on the sleeve 6 is a ring 11 which serves to adjust the differential gearing relatively to the ball bearings, the ring bearing against an angular bearing ring 12 which forms a part of the ball races. On the sleeve 7 is another threaded adjustable ring 13 which bears against an angular ring 14. The ring 14 is supported on three sets of balls, as more fully described in said previous application. By means of the threaded rings 11 and 13 the differential gearing may be properly adjusted with respect to the transmission gearing and may also be adjusted to take up wear of the beveled gears.

Adjacent to and suitably connected to the fixed casing 10 is another casing 15 adapted to support and inclose the transmission gearing. A driving shaft 16, suitably connected to the engine shaft, has suitable ball bearings 17 in one end of the casing 15. Said driving shaft is also rotatably supported in a sleeve or hollow shaft 18 which rotates in a suitable bearing in the opposite end of the casing, adjacent to the differential gearing. The extreme end of the shaft 16 is supported in an adjustable bearing 16ª. On one end of shaft 18 is a gear 20 having both external and internal teeth and on the opposite end of the sleeve is fixed a bevel gear 21 which is in mesh with the beveled gear 4 which drives the differential gears. The gears 20 and 21 and the shaft 18 are carried by a ring 22 which is threaded and adjustable in an opening in the end of the casing. The shaft 18 turns in the ring 22, preferably in ball bearings 19, and the gear 21 has a bearing on the end of said ring, also preferably a ball bearing as shown at 23. This construction is very convenient both for assembling the machinery and for afterward adjusting the gear 21 properly to the gear 4. The ring 22 and the gears 20 and 21 are assembled and suitably adjusted with relation to each other outside of the casing and are then collectively adjusted in the casing by screwing the ring 22 into the circular opening. This is effected by passing a key or spanner or other suitable device through suitable openings in the gear 20 and into one or more openings in the ring 22. The ring 22 may be held in any desired adjustment by a set screw or other suitable device, and the shaft, it will be observed, is held against endwise movement in the ring.

In the casing 15 is a counter shaft 24, which is preferably supported in ball bearings. Upon the counter shaft are three gears 25, 26, 27, of different diameters and all locked to said shaft. The gear 25 is in mesh with the external teeth of the gear 20.

Two connected gears 28, 29 of different sizes are mounted to slide on and turn with the shaft 16. As shown these gears are upon an angular portion of said shaft. The gear 29 is adapted to mesh with the gear 26 when brought to register with it and the gear 28 is likewise adapted to mesh with the gear 27. The gears 28, 29 are arranged to be moved along shaft 16 by a yoke 30 which is carried by a sliding rod 31. The rod 31 is provided with a series of annular grooves 32 and a spring latch 33 coöperates with said grooves to lock the rod in these different operative positions. The latch 33 as shown consists of a ball which is pressed by a spring 34 inclosed in a cap 35. The inner end of rod 31 is stiffened and guided by a fixed pin 36 which enters an axial opening in said rod.

The different forward speeds are obtained by shifting the gears 28, 29 to different positions. When the gears 28, 27 intermesh the lowest speed is obtained. The gears 26, 29 produce an intermediate speed, and to obtain the highest speed the gear 29 is moved into mesh with the internal teeth of the gear 20. In this manner the beveled gear 21 is turned at the same speed as the engine shaft. The gears of the counter shaft 24 run idle when the machine is running at full speed.

The backing or reverse gear 37 is carried by an arm 38 within the casing, said arm being mounted on a rock shaft 39 having a second arm 40 outside of the casing. As shown the arm 40 is connected to toggle levers 41 which are operated by a suitable connection 42 extending to the front of the vehicle. When the toggle levers are brought approximately into line with each other, the gear 37 is thrown into mesh with the gears 27 and 28, as shown in full lines in Fig. 2. When the toggle levers are thrown out of alinement, the backing gear is thrown into the dotted position as illustrated in Fig. 2.

I provide for preventing the backing gear from being thrown into action excepting when the sliding gears 28, 29 are exactly in the proper position, that is, between the gears 26 and 27 and not in mesh with either of them. For this purpose a shoe or extension 43 is carried by the arm 38. This shoe projects beyond the reverse gear 37 and prevents it from engaging with the gear 28 when it is not properly registered therewith. When the gear 28 is in proper position for engagement with the reverse gear the shoe 43 will register with and enter the annular groove between gears 28 and 29. To permit it to enter said groove freely one arm of the yoke 30 is shorter than the other arm. If the reverse lever be operated while the shoe 43 is opposite the gear 29 its surface 44 will strike said gear and prevent engagement of the backing gear and if the reverse lever is operated while the shoe is opposite the gear 28, the surface 45 will engage said gear and prevent the backing gear from being thrown in. It will be evident that this interlocking device is adapted to absolutely prevent the reverse gear from being thrown into operation while the machine is running at any of the forward speeds or while the forward speed gears are in mesh. The stripping of gears or any sudden reversal of the movement of the vehicle is thus prevented.

Having thus fully described my invention what I claim and desire to secure by Letters Patent, is:—

1. In a motor vehicle, the combination of a shaft, a driving gear wheel thereon, a driven shaft, differential gearing thereon, a driven gear wheel connected to the differential gearing, a casing containing said gear wheels, a ring having screw thread connection with said casing and in which the said shaft is revolubly held, means for adjusting said ring in said casing and means for adjusting the driven gear on the driven shaft.

2. In a motor vehicle, the combination with two series of relatively movable gears, and a reverse gear adapted to connect a gear of one series with a gear of the other, of means movable with the reverse gear to prevent it from reaching operative position when any of the forward speed gears are operative.

3. In a motor vehicle, the combination of a sliding gear, a non-sliding gear and a reverse gear, of a shoe movable with the reverse gear and adapted to contact with one of said other gears to prevent the reverse gear from reaching operative position, except when said sliding gear is in proper relation to the reverse gear.

4. In a motor vehicle, the combination with a pair of sliding gears having an intermediate annular groove, of a reverse gear and a shoe movable with said gear and adapted to enter said groove when the sliding gears are in position for reversing, and to contact with said gears when they are out of position for reversing.

5. In a motor vehicle, the combination with variable speed gears, of a reverse gear, a rocking arm carrying said reverse gear and toggle levers for rocking said arm.

6. In a motor vehicle, the combination with variable speed gears and a backing gear, of a rocking arm upon which said backing gear is mounted, and a shoe carried by said arm and provided with surfaces 44, 45 for engaging with the variable speed gears to prevent the backing gear from interlocking therewith excepting when said variable speed gears are in proper relation.

7. In a motor vehicle, the combination with the two-part driving axle and the differential gearing, of a casing surrounding said gearing and provided with extensions forming bearings for the axle, the bevel gear supported on said casing, a second bevel gear for driving the first named bevel gear, and threaded adjustable rings on said extensions for adjusting the mesh of said bevel gears.

8. In a motor vehicle, the combination with the two-part driving axle, the differential gearing, the bevel gear connected to said differential gearing for driving the latter, a second bevel gear for driving the first named bevel gear, rotatable adjusting rings for adjusting each of said bevel gears with respect to the other, and means for locking said rings in any desired adjustment.

9. In a motor vehicle, the combination with the two-part driving axle, the differential gearing, the bevel gear connected to said differential gearing for driving the latter, a second bevel gear for driving the first named bevel gear, threaded adjusting rings for adjusting each of said bevel gears with respect to the other, and means for locking said rings in any desired adjustment.

10. In a motor vehicle, the combination with a two-part driving axle, the differential gearing, a housing therefor, a bevel-gear on the differential housing for driving the latter, a second bevel-gear for driving the first named bevel-gear, rotatable adjusting rings for adjusting each of said bevel-gears with respect to the other, and means for locking said rings in any desired adjustment.

11. In a motor vehicle, in combination with the variable speed gearing, a casing, a shaft driven by said gearing, a gear on said shaft and driven thereby, a ring provided with a bearing and having threaded engagement with an opening in said casing, and said shaft and gear being adapted to be moved through said opening into said casing when said ring is disengaged therefrom.

In testimony whereof I have signed my name to this specification in the presence of two subscribing witnesses.

CHARLES SCHMIDT.

Witnesses:
RUSSELL HUFF,
HENRY B. JOY.